United States Patent [19]

Liu

[11] Patent Number: 5,418,922
[45] Date of Patent: May 23, 1995

[54] HISTORY TABLE FOR SET PREDICTION FOR ACCESSING A SET ASSOCIATIVE CACHE

[75] Inventor: Lishing Liu, Pleasantville, N.Y.

[73] Assignee: International Business Machines Corporation, Armonk, N.Y.

[21] Appl. No.: 876,850

[22] Filed: Apr. 30, 1992

[51] Int. Cl.⁶ .................. G06F 12/00; G06F 13/00
[52] U.S. Cl. .................. 395/425; 364/DIG. 1; 364/243.41; 364/256.6; 364/955.5; 364/961.2; 364/966.4; 395/400
[58] Field of Search ................ 395/425, 400; 364/200 MS File, 900 MS File

[56] References Cited

U.S. PATENT DOCUMENTS

| | | | |
|---|---|---|---|
| 5,093,778 | 3/1992 | Favor et al. | 395/375 |
| 5,148,538 | 9/1992 | Celtruda et al. | 395/425 |
| 5,168,571 | 12/1992 | Hoover et al. | 395/800 |
| 5,197,132 | 3/1993 | Steely, Jr. et al. | 395/375 |
| 5,230,068 | 7/1993 | Van Dyke et al. | 395/375 |
| 5,235,697 | 10/1993 | Steely, Jr. et al. | 395/425 |

Primary Examiner—Rebecca L. Rudolph
Assistant Examiner—Frank Asta
Attorney, Agent, or Firm—Ronald L. Drumheller

[57] ABSTRACT

A cache control maintains a history table SETLAT for the prediction of line entry (i.e., set member) within a congruence class for cache accessing. For a given cache access, a SETLAT entry can be selected based on the requesting logical address bits directly. The selection of a SETLAT entry may also be based on the hashing of such logical address bits together with other information in order to achieve sufficient randomization. A similar hashing history table may be devised to predict virtual address translation information with high accuracy. Such prediction mechanisms not only allow efficient implementation of the cache access path but also offer the opportunity of achieving multiple accesses per cycle.

The proposed prediction method also provides a generic approach to efficient implementations for various directory based table accesses.

8 Claims, 7 Drawing Sheets

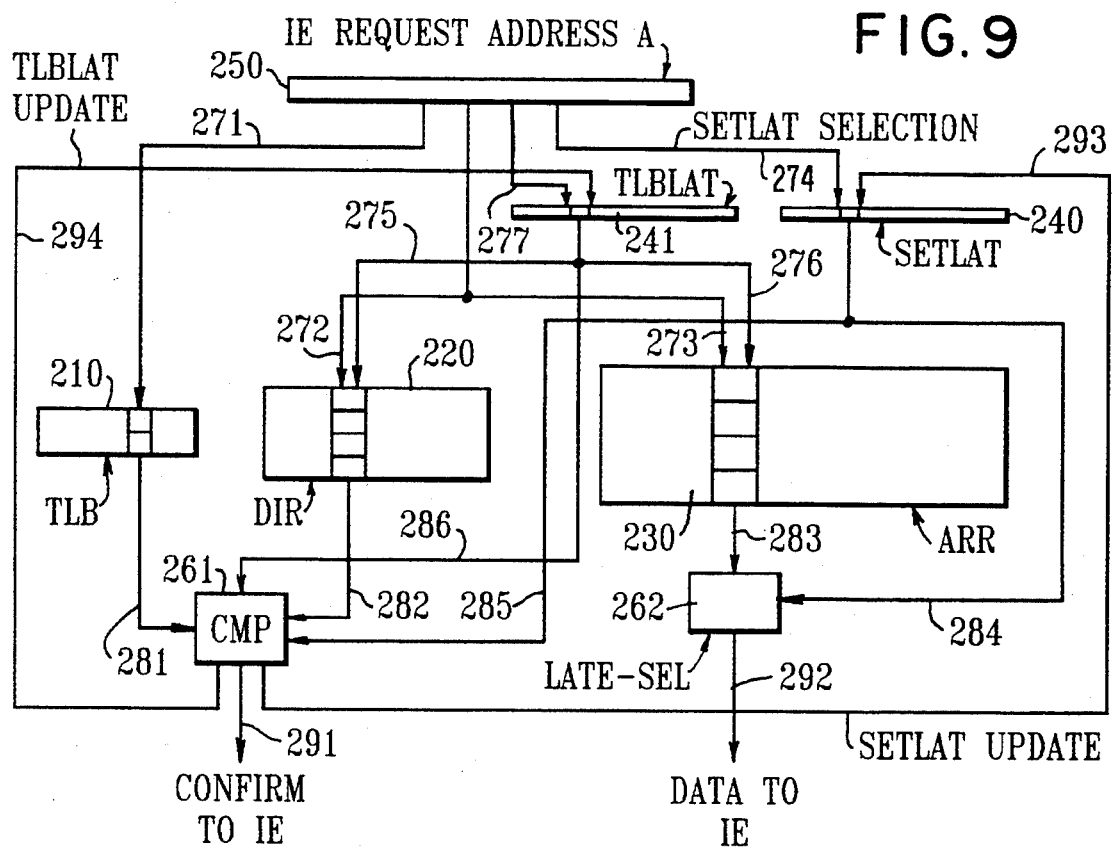
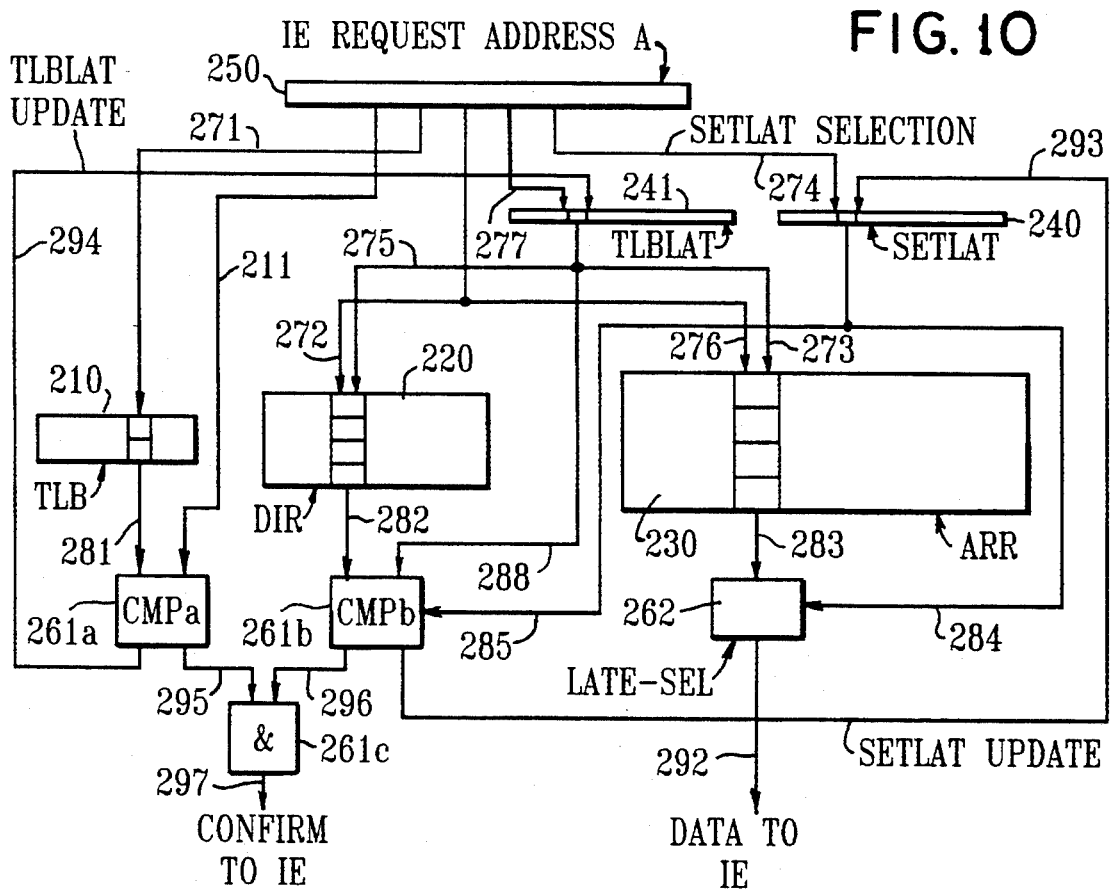

HISTORY TABLE FOR SET PREDICTION FOR ACCESSING A SET ASSOCIATIVE CACHE

DESCRIPTION

FIELD OF THE INVENTION

This invention generally relates to set associative caches for computer systems and more particularly to schemes for determining the set member of a congruence class for an access.

CROSS-REFERENCE TO RELATED APPLICATION

A related application has been filed concurrently herewith entitled "HISTORY TABLE FOR PREDICTION OF VIRTUAL ADDRESS TRANSLATION FOR CACtlE ACCESS" by the same inventor as this application and assigned to the same assignee as this application.

BACKGROUND OF THE INVENTION

The use of caches for performance improvements in computing systems is well known and extensively used. A cache is a high speed buffer which holds recently used memory data. Due to the locality of references nature for programs, most of the access of data may be accomplished in a cache, in which case slower accessing to bulk memory can be avoided.

In typical high performance processor designs, the cache access path forms the critical path. That is, the cycle time of the processor is determined by how fast cache accessing can be carried out.

A cache may logically be viewed as a table of data blocks or data lines, in which each table entry covers a particular block or line of memory data. (Hereinafter the storage unit for a cache will be referred to as a line rather than a block.) The implementation of a cache is normally accomplished through three major portions: Directory, Arrays and Control. The directory contains the address identifiers for the cache line entries, plus other necessary status tags suitable for particular implementations. The arrays (sometimes called cache memory herein) store the actual data bits, with additional bits for parity checking or for error correction as required in particular implementations. The control circuits provide necessary logic for the management of cache contents and accessing. Upon an access to the cache, the directory is looked up to identify the residence of the requested data line. A cache hit results if it is found, and a cache miss results otherwise. Upon a cache hit, the data may be accessed from the array if there is no prohibiting condition (e.g., key protection violation). Upon a cache miss, the data line is normally fetched from the bulk memory and gets inserted into the cache first, with the directory updated accordingly, in order to satisfy the access though the cache. Since a cache only has capacity for a limited number of line entries and is relatively small compared with the bulk memory, replacement of existing line entries is often needed. The replacement of cache entries is normally based on algorithms like the Least-Recently-Used (LRU) scheme. That is, when a cache line entry needs to be replaced, the line entry that was least recently accessed will be preferred.

In order to facilitate efficient implementations, a cache is normally structured as a 2-dimensional table (FIG. 1). The number of rows is called the set-associativity, and each column is called a congruence class. For each data access, a congruence class is selected using certain memory address bits of the access, and the data may be accessed at one of the line entries in the selected congruence class if it hits there. It is usually too slow to have the cache directory searched first (with parallel address compares) to identify the set position (within the associated congruence class) and then to have the data accessed from the arrays at the found location. Such sequential processing normally requires 2 successive machine cycles to perform, which degrades processor performance significantly. A popular approach, called late-select, achieves a directory search and array data accessing in one cycle as follows. Consider the fetch of a data unit (e.g., a doubleword) by an execution element. Without the knowledge of the exact set position for access, the array control will retrieve candidate data units from lines at all set positions in the congruence class first, while the directory is looked up. Upon a cache hit, the directory control signals the final selection of one of those retrieved data units and sends it to the requesting execution element. Although the conventional late select technique allows much overlap between directory look up and array access, the final data selection can only be done after the directory search is done and the results are passed to the selection unit. Another deficiency of the late select method is that multiple data units accessed out of arrays can only cover at most one actually useful data unit, with the rest of the accessed units being wasted. In higher performance processors it is often critical for the cache to support multiple independent accesses from I/E-units, for which wasting I/O on futile array accessing becomes a design bottleneck.

Another aspect that complicates cache design is the commonly employed virtual addressing architecture in computer systems. In a virtual memory system (e.g., the IBM/390 architecture) each user process may have the view that it has its own virtual address space. Upon execution of programs the operating system may dynamically allocate real memory pages (e.g., 4 kilobytes per page) to more actively accessed virtual address pages. When a page accessed from a program does not have a real memory page allocated for it, an exception (page fault) condition will occur and triggers the operating system to properly allocate a real memory page frame. Page fault processing is normally associated with a very high performance overhead and often requires data accessing from slower backing devices like disks. However, due to the strong nature of program locality, a reasonable operating system can maintain a very low page fault rate during program executions. The operating system normally maintains the real page allocation information in architecturally specific software tables. Typically a 2-level translation table structure with segment and page tables are used for this purpose. Each program space has its own segment table, in which each entry points to a page table. At a page table each entry records the real page allocation information, plus some other status tags needed for particular architectures.

The operating system manages such translation tables according to its design algorithms. One consequence of the employment of virtual addressing is that the same virtual page address from different program address spaces may not be logically related and may be allocated at different real page frames in the storage. Furthermore, in architectures like the IBM/390, the same real page frame may be accessed through different virtual addresses from different programs or processors. With all these architectural requirements, most systems require a step called virtual address translation for processing storage accesses from processors. Virtual address translation translates a virtual page address into a real page address. A page fault exception is triggered if the real page frame is not allocated, for which the operating system will update the translation information when allocation is complete and then allow the faulted program to resume execution.

In most modern systems, hardware facilities are used for speeding up the virtual address translation process. Typically a Translation Lookaside Buffer (TLB) is employed for each processor. A TLB is a hardware directory table that records the translation information for actively accessed virtual pages. Due to the locality nature of program addressing, a relatively small TLB (e.g., with 64–1024 page entries) can capture the translationinformation for great majority (e.g., over 99.95%) of storage accesses from a processor. Only upon a TLB miss condition (i.e., when the TLB cannot cover the particular storage access) will a slower translation (e.g., through microcode or the operating system) be activated. For efficiency in hardware implementation, a TLB is normally structured as a set-associative table like the cache directory. For a given virtual page address (including certain program space identifiers), the hardware uses certain address bits (and other information specific to a particular design) to derive a congruence class. Within the congruence class, the hardware performs a parallel search of the entries and identifies the results of translation.

In many processor designs, a storage access needs to go through TLB translation prior to the final resolution of a cache access. In most modern designs the TLB look-up is carried out in parallel with the cache directory search, with their results merged for final late-select of the array data. FIG. 2 depicts such a design. Such requirement of multiple directory searches for the resolution of cache accessing has been a source of complexity for the optimization of many cache designs. All such complications are due to the fact that, when a processor issues a storage access request, the cache array cannot determine the exact location of data without knowing the results of conventional directory look-ups, which produces signal delay. Unfortunately, due to various architectural and machine organizational reasons, such exact location for data access cannot be obtained easily. One side effect of the conventional late-select mechanism is the wasteful array I/O's used in retrieving multiple data units for the possible final selection of at most one for the processor's use. As a result, it often causes difficulties in supporting concurrent multiple (independent) cache accesses in very high performance computers.

There have been many design proposals for implementing caches effectively. FIG. 3 outlines the IBM/3090 design of a 64 kilobyte (KB) processor cache for 31-bit logical addressing. The cache is 4-way set-associative with 128 congruence classes. The line size is 128 bytes. There is a cache directory DIR, cache memory data arrays ARR, and a 2-way set-associative TLB. The processor I/E-units and microcode issue storage access requests by a logical address. The logical address can be either virtual or real, depending upon the current mode of addressing at the processor. The more complicated case will be described for a doubleword (8 bytes)-fetch request with virtual address from an I/E-unit.

Among the bits 18–24 used for selecting the congruence class, two bits (18–19) are part of the page address. It can happen that, due to unpredictable translation results, these two bits get translated to 2 real address bits in any of the four possible combinations. Among the four congruence classes that may possibly contain the line being accessed, the one determined by the address bits in the currently accessed logical address is called the principal congruence class (PCC), and the other three are called synonym congruence classes. Although program locality will cause a great majority of cache accesses to hit the principal congruence class, there are still chances that the accessed line belongs to one of the other (synonym) congruence classes. This is the so-called synonym problem. In the IBM/3090 system design, the following steps are carried out in parallel:

1. Bits 18–31 of the logical access address are passed to the ARR control. Bits 18–24 are used to determine the principal cache congruence class. Then a doubleword (as indicated by bits 25–28) is read out of the cache arrays from each of the four line entries in the principal congruence class. These four doublewords will not be sent out to the requesting I/E-unit untill a late-select signal is received.
2. Bits 18–24 are sent to DIR for cache directory look-up. Each DIR entry records the real address for the associated line. All 16 directory entries of the principal and synonym congruence classes are read out.
3. Certain virtual address bits (not elaborated here) are used by the TLB to select the congruence class, from which the real address translation information of the 2 TLB entries are read out.

The 16 real line addresses read out of the cache directory are then merged with the 2 real addresses read out of the TLB for address match via 32 comparators. (There is other tag matching involved and not elaborated here.) When it is found that the translated address of the accessed line matches one of the cache directory real addresses, a cache hit condition results. Otherwise a cache miss occurs and triggers cache miss processing. Upon a cache hit situation the congruence class containing the line may or may not be in the principal congruence class. The following then is carried out by the cache control:

Principal Congruence Class (PCC) Hit—A signal is sent to the late-select logic to gate the selected doubleword to the requesting I/E-unit. The access is complete.

Synonym Congruence Class Hit—Proper steps will be taken to have the doubleword accessed from the synonym congruence class through later array fetching. This will result in longer delays to the access.

In the cache miss situation, the cache control will request a copy of the line from main storage. When the line comes back it will be placed in an allocated cache entry in the principal congruence class.

The IBM/3090 cache design reveals the following deficiencies. First of all, 32 comparators are used to resolve synonym conditions efficiently. Even more comparators will be required if the cache size expands or if the TLB set-associativity increases. The second problem is the longer cache access path due to the waiting of late-select for directory read/compare results.

There have been designs that employ certain types of prediction methods to avoid the above mentioned inefficiencies. The best known method is the direct-map cache design. A direct-map cache is one with a set-associativity of 1. Since there is only one line entry at each cache congruence class, cache access possibilities is very limited. FIG. 4 describes a direct-map cache design by modifying the IBM/3090 approach. Similar to the IBM/3090 design, upon a cache miss the line is placed in the principal congruence class. For each logical address issued by the I/E-unit, the cache control extracts needed bits to select the principal congruence class, and the data is tea there directly to the requesting unit. In parallel, cache directory and TLB look-ups are done. In case of a cache hit to the principal congruence class, the directory compare logic will send a signal to the requesting I/E-unit to complete the access. Otherwise (a cache miss or a hit to a synonym congruence class) a signal is sent to the requesting unit to cancel the data it received from ARR and triggers proper actions. The synonym problem still exists as in the IBM/3090 design. There have also been real address cache designs that, upon a cache miss, inserts a cache line into the congruence class determined by the real address bits after translation. Such approach, however, loses the parallelism between array accessing and directory searches. The most serious drawback of the direct-map cache design is the poor cache hit ratio. It is well-known that, For the same size cache, the cache hit ratio significantly improves as the set-associativity increases from 1 to 2 to 4.

Another lately proposed technique for prediction based cache design is the MRU cache design of J. H. Chang, H. Chao, and K. So, in "Cache Design of A Sub-Micron CMOS System/370," *Proc.* 14th Symposium on Computer Architecture, 1987, pp. 208–213. Cache replacement is normally managed on a per congruence class basis. Within each congruence class, there is a most-recently-used (MRU) entry and a least-recently-used (LRU) entry as indicated by proper replacement status tag. Due to program locality, a cache access is most likely to hit to the MRU line entry. The LRU entry is the one chosen for replacement when a new line needs to be inserted into the congruence class. The MRU-cache approach logically views the MRU lines of the whole cache as a direct-map cache. The basic principle is that, whenever a congruence class is determined to be accessed, the data will be retrieved from the MRU line entry on a prediction basis. The confirmation or cancellation of the access, based on directory compare results, will operate similar to the direct-map cache approach. The MRU-cache design proposed a real-address cache, in which a missed line will be inserted to the congruence class associated with the real address bits (after translation). In order to facilitate the determination of a cache access by virtual address, the MRU-cache design applies similar techniques to predict the address translation information. That is, for a given virtual address, the real address bits at the MRU entry of the associated TLB congruence class are read out and passed to the array control before the real address is verified as the actual translation. The predicted real address bits from the TLB are used by the array control to select the (predicted) congruence class For MRU entry data read, while in parallel the TLB unit does comparisons to determine the correctness of the real address prediction. FIG. 5 depicts the MRU-cache design.

Compared with the direct-map approach, the MRU-cache design reduces cache miss probability by allowing more than 1-way set-associativity. However, the MRU prediction provides worse accuracy for cache access prediction. For a direct-map cache, there is a 100% accuracy of prediction when a cache hit occurs (cache misses cannot be satisfied anyway). But the accuracy For MRU prediction is limited by how likely the accesses hit to the MRU entries. Consider a 64 KB cache described in the IBM/3090 design example. For a typical commercial workload a little over 90% of the actual cache hits can be resolved correctly by the prediction. The accuracy of prediction can become worse for different workloads. Also, simulation studies have showed that, when the MRU-cache approach is applied to data caches (i.e., caches that handle only operand accesses and not instruction code fetching) the accuracy of MRU entry prediction becomes much worse. Another deficiency of the MRU-cache design is the requirement of accessing the TLB (for the MRU entry) prior to the array accessing. This causes certain delays on the cache access critical path. Furthermore, complexity is involved in implementing it properly. Since a TLB is a relatively larger directory, it normally cannot be placed very close to the cache arrays physically. Another consequence of the TLB size is the expense in implementing a TLB directory with Fast circuits. Both factors make it difficult to optimize the timing of the real address prediction path, and hence the cache access critical path, in high speed computers.

The weaknesses of the prediction methods adopted in the direct-map and the MRU-cache approaches come from the Fact that they both are carried out based on physical structures of the cache or the TLB. The direct-map design achieves ultimate simplicity and prediction accuracy by flattening the physical cache geometry (to a 1-dimensional structure), and hence increases cache misses. The MRU-cache approach requires that the predictions (for TLB and cache) be based on the physical MRU entries, and hence loses accuracy and causes difficulties in implementation.

The real essence of a good prediction approach to cache accessing is to employ proper histories to achieve high accuracies and efficient implementations. In order to access a cache with 2-dimensional structure two parameters need to be determined: 1) the congruence class, and 2) the line entry position (i.e., set position) within the congruence class. Both parameters may be accurately predicted with history tables or other means that are effectively implementable and independent of the actual cache geometry. A similar principle applies to the prediction of real address translations. There is no known prior art that utilizes this concept and provides effective cache accessing with flexibility on implementations.

SUMMARY OF THE INVENTION

It is therefore an object of the present invention to provide highly accurate prediction mechanisms that allow efficient implementations of cache accessing. The prediction methods will be based on proper history tables.

According to the invention, the cache control maintains a history table SETLAT for the prediction of line entry (i.e., set member) within a congruence class for cache accessing. For a given cache access, a SETLAT entry can be selected based on the requesting logical address bits directly. The selection of a SETLAT entry may also be based on the hashing of such logical address bits together with other information in order to achieve sufficient randomization. A similar hashing history table may be devised to predict virtual address translation information with high accuracy and is described in detail in the cited co-pending related application. Such prediction mechanisms not only allow efficient implementation of the cache access path but also offer the opportunity of achieving multiple accesses per cycle.

The proposed prediction method also provides a generic approach to efficient implementations For various directory based table accesses.

More specifically, a mechanism is disclosed for the array control to predict the data location for a given access in a set-associative cache. When the prediction is correct, the performance is the same as if the location is known. In the case of a wrong prediction, the data access is aborted and re-issued properly. With a highly accurate prediction mechanism, data accessing of a cache can be optimized with minimum overhead for wrong predictions.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 9 is a block diagram illustrating a real address cache design with the addition of a simple TLBLAT history table in accordance with this invention for fast resolution of congruence class selections;

FIG. 10 is a block diagram illustrating a modification to the design of FIG. 9 with the TLBLAT enhanced with full real page address bits;

DETAILED DESCRIPTION OF PREFERRED EMBODIMENTS OF THE INVENTION

Figure 1:
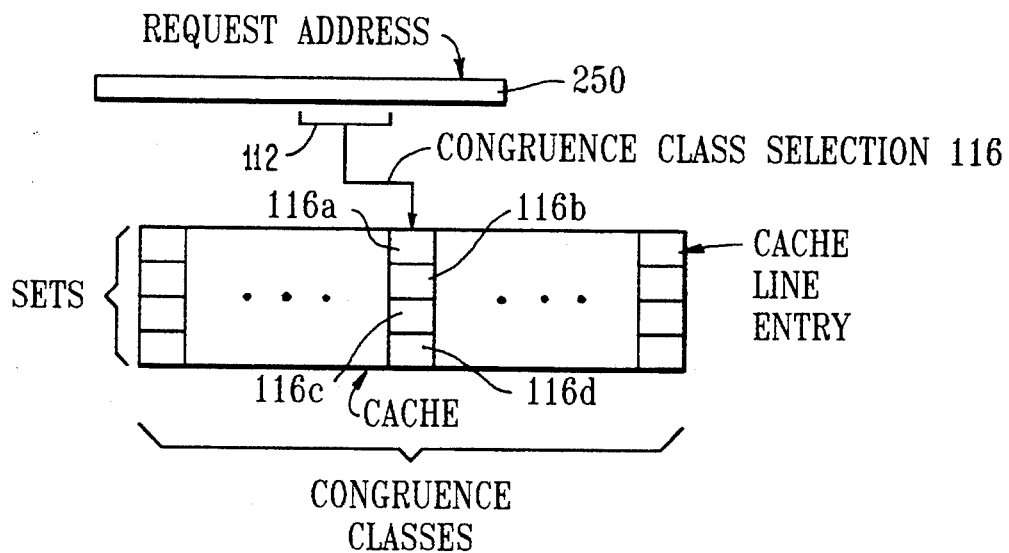
FIG. 1 is a block diagram showing the 2-dimensional structure of a typical cache.
Figure 2:
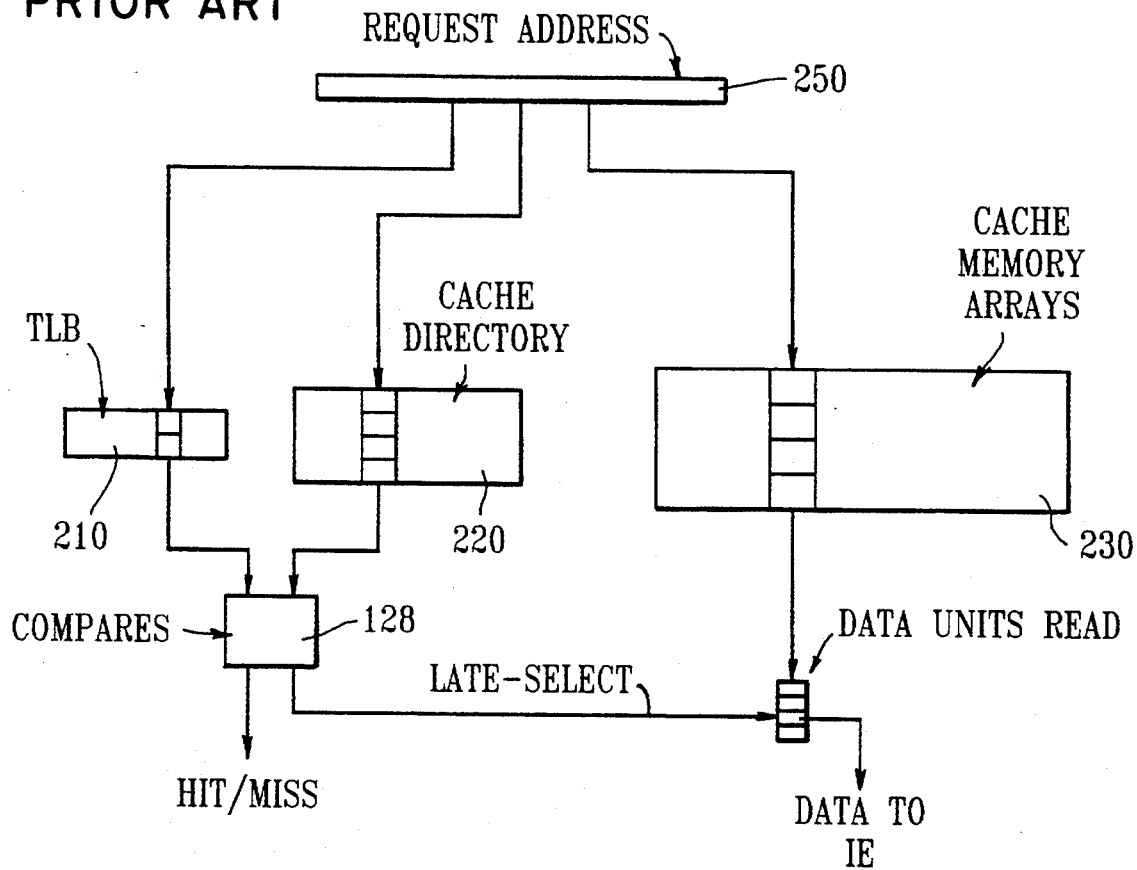
FIG. 2 is a block diagram of a prior art method illustrating the operations of reading TLB and cache directory entries, address compares, array data reading, and the late select of data.
Figure 3:
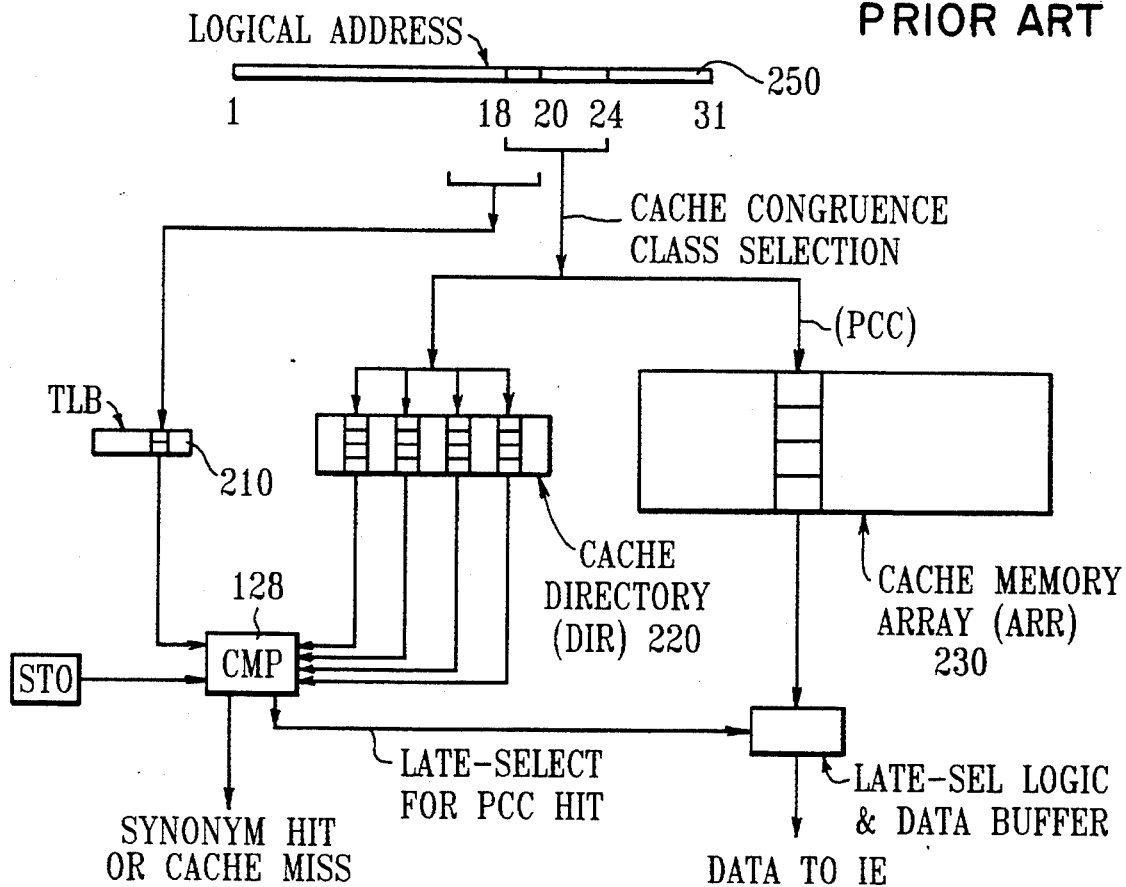
FIG. 3 is a block diagram showing the IBM/3090 cache design.
Figure 4:
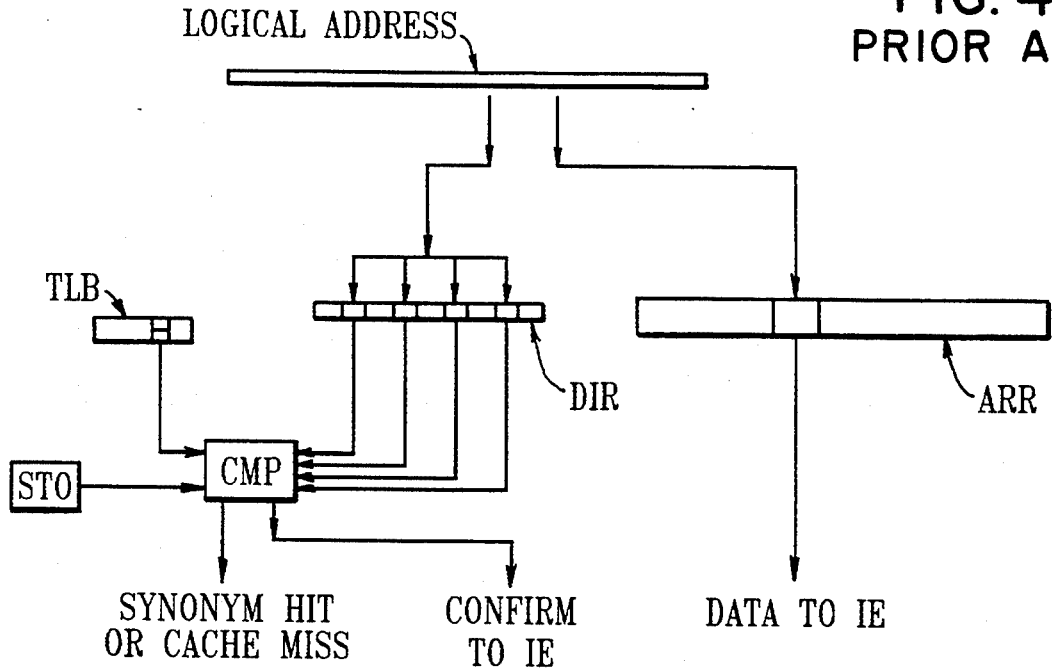
FIG. 4 is a block diagram illustrating a direct-map cache design.
Figure 5:
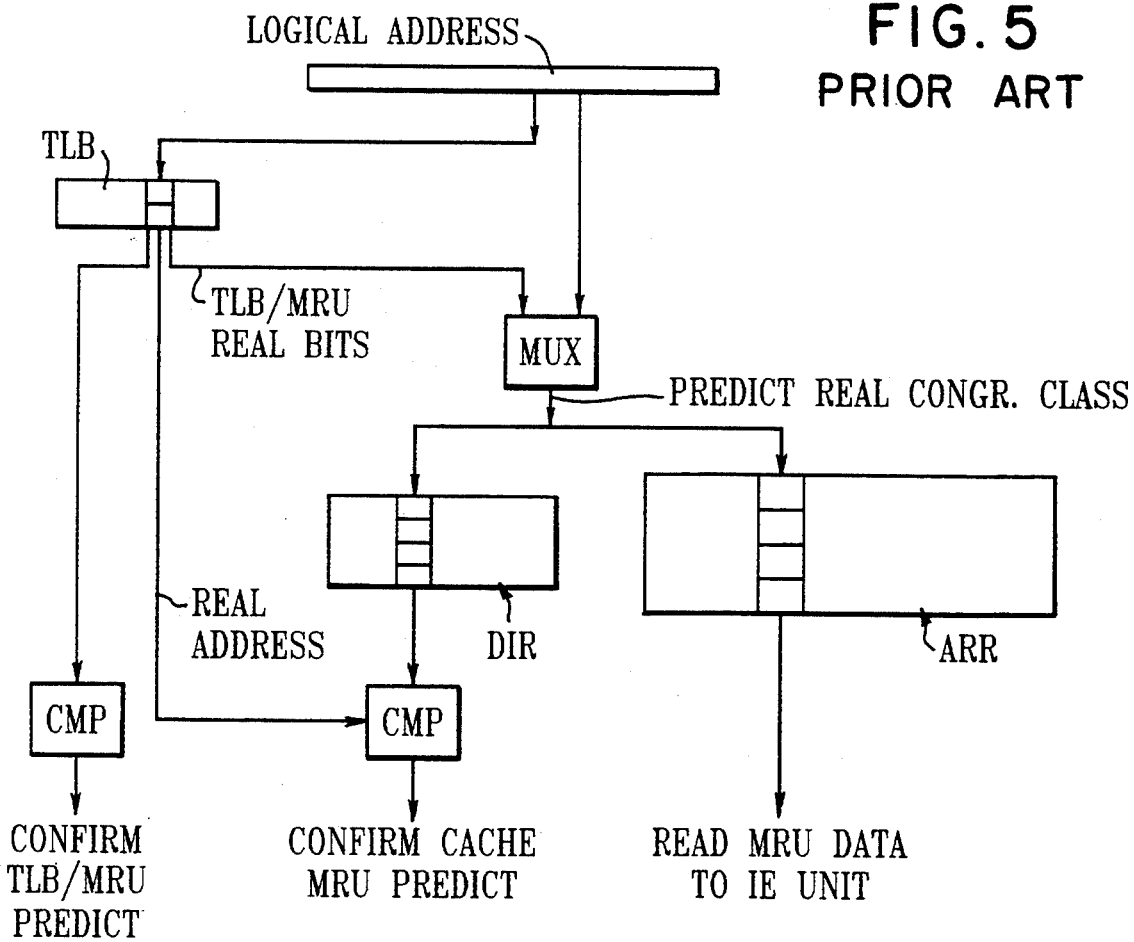
FIG. 5 is a block diagram illustrating the MRU-cache design.
Figure 6:
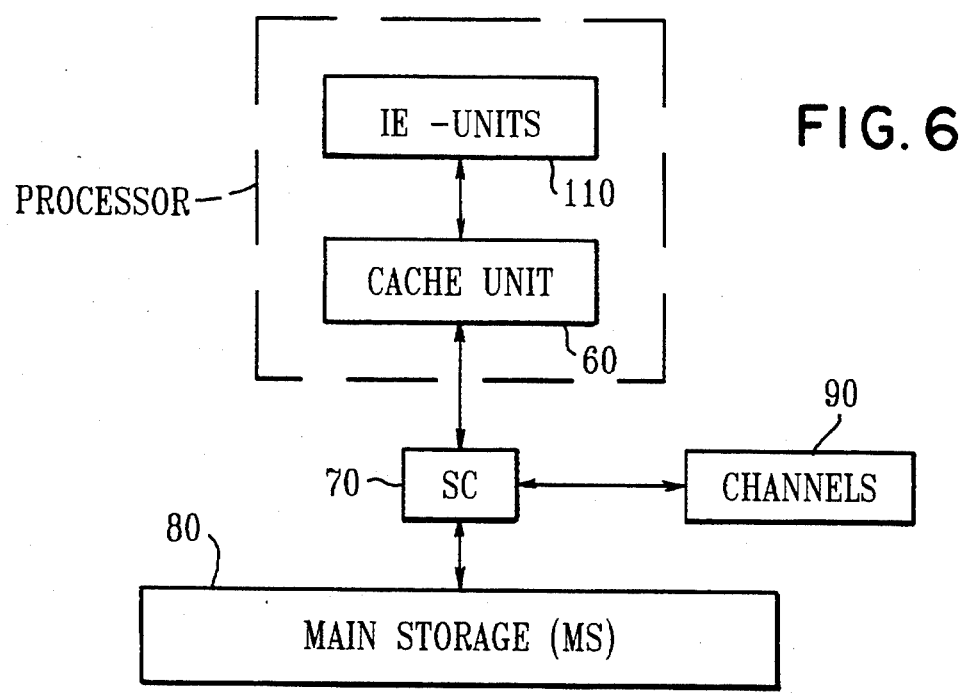
FIG. 6 is a block diagram illustrating the high level system organization considered in the embodiments.

Referring now to the drawings, and more particularly to FIG. 6, there is illustrated in block diagram form a system structure of the type in which the invention may be used. The processor comprises instruction and execution (IE) units 110 anti a cache unit 60. Each IE includes hardware and microcode that issue instructions that require the fetching and storing of operands in main storage (MS) 80. A Storage controller (SC) 70 coordinates storage related activities requested by the processor or the I/O channels 90. For simplicity of description, it will be assumed that the IE-units 110 can issue at most one storage fetch or store request each cycle, and each storage request is within a doubleword (8 bytes) granule.

When the cache line that includes the doubleword requested by the IE units 110 resides in the cache unit 60, the condition is called a cache hit. Otherwise the condition is called a cache miss. Upon a cache miss, except for certain very special conditions, the cache unit 60 needs to request the line from MS 80 through the SC 70 first before satisfying the request from IE 110.

Figure 7:
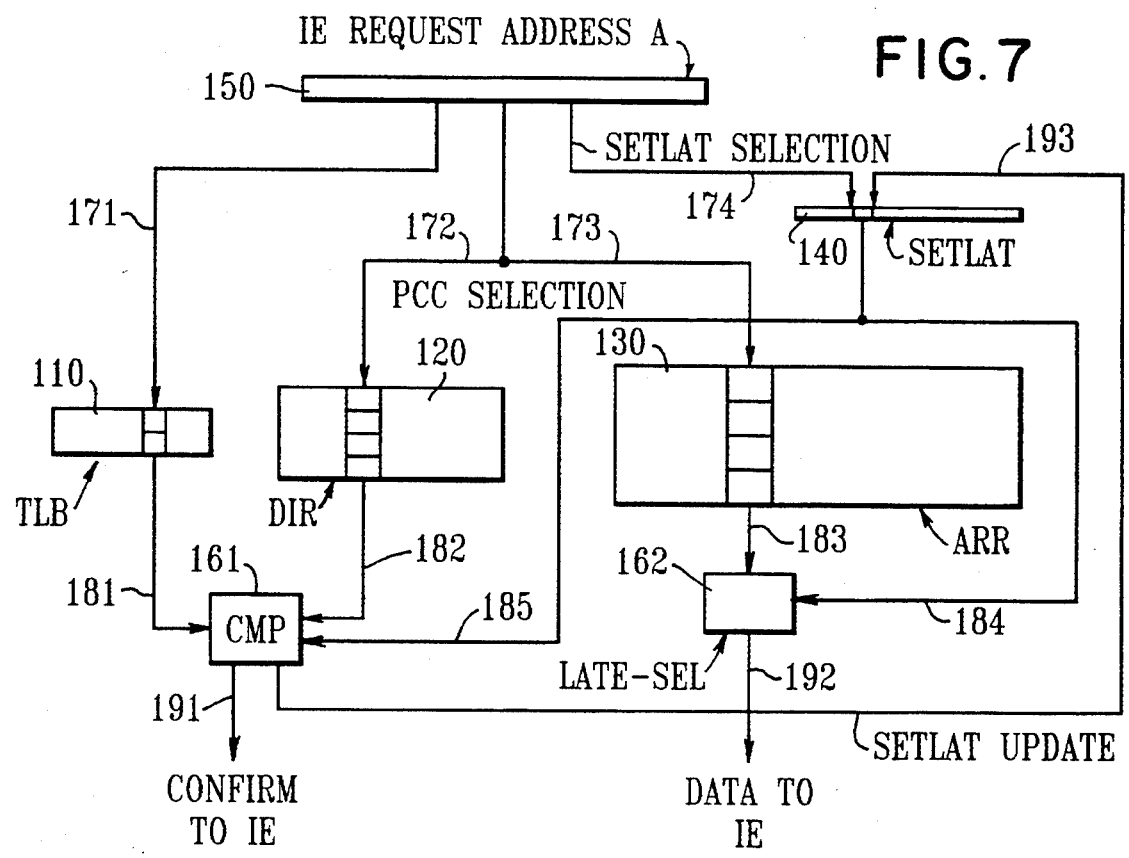
FIG. 7 is a block diagram illustrating the modification of tile IBM/3090 cache design in accordance with this invention by the addition of a SETLAT history table for prediction of set-positions.

FIG. 7 is a more detailed diagram of the cache unit 60. There are three major elements as in conventional cache designs. TLB 110 is the translation lookaside buffer used for fast translation from virtual addresses to real addresses. DIR 120 is the cache directory that contains, for each line entry of the cache, the address identification and other needed status tags. ARR 130 is the cache memory arrays that hold the actual cache data. In addition to these three conventional elements, the new design in accordance with this invention also includes a history table SETLAT 140, which is used to predict the line entry within a congruence class for data accessing. For illustration purposes, a 4-way set-associative cache and a 2-way set-associative TLB is assumed. SETLAT 140 may be considered as a 1-dimensional history table, with 2 bits per entry.

The high level flow of cache fetch access operations depicted in FIG. 7 may be considered as a modification to the IBM/3090 cache design. At each entry of DIR 120, the real address of the associated line (if indicated valid) is recorded. For a given doubleword fetch request specified as a virtual address A 150 from IE, the following will occur in parallel:

1. Certain bits of the virtual address A 150 are used via path 171 to select a congruence class (TLBCONG[A]) from TLB 110. The real addresses (along with other needed status tags) at the 2 entries of TLBCONG[A] are passed via path 181 to an address-compare unit (CMP) 161.
2. Certain bits of the virtual address A 150 are passed along path 172 and used to select a set of congruence classes in DIR 120. Just like the IBM/3090 design, the selected congruence classes cover the principal and all possible synonym classes. The real line addresses (along with other needed status tags) at all DIR entries in the selected congruence classes are are passed along path 182 to CMP 161.
3. Certain bits of the virtual address A 150 are passed along path 173 and used to select the principal congruence class (CONG[A]) in ARR 130. From the selected congruence class, four doublewords are read out of the arrays, one from each set member of the congruence class. The four doublewords read out are passed to a late-select unit 162.

4. Certain bits of the virtual address A 150 are passed along path 174 and used to select an entry (SETLAT[A]) in SETLAT 140. The 2 bits at the selected SETLAT[A] entry are passed along path 184 to the late-select control 162. The 2 bits are also passed along path 185 to CMP 161.

Note that CMP 161 also needs additional address bits (e.g., those of A 150 between the page boundary and the line boundary), for which the data paths are not specifically indicated in FIG. 7.

The late-select logic 162 selects, based on the 2 bits obtained from SETLAT[A], one of the four doublewords read out of the arrays and held in logic 162. The selected doubleword is sent via path 192 directly to the requesting IE. The function of the CMP 161 logic is to determine whether the doubleword data sent via path 192 to the requesting IE is from the correct cache line entry. CMP 161 may also determine other abnormal conditions (e.g., storage key violation) that will trigger more complexities for the access, which will be ignored due to the lack of significance to the current invention. The line 193 from CMP 161 to SETLAT 140 is the SETLAT Update Line, which is used for updating set-position histories in SETLAT 140 as will be discussed later. Although not detailed in the current embodiment, in many implementations there can be other functions (e.g., cache and TLB replacement management) at CMP 161 or its surrounding units so that needed information can be determined efficiently and signal passing (e.g., along with SETLAT update 193) can be implemented effectively. The data sent via path 192 to IE 110 is correct only when the following happens:

The entry (denoted DIR[A]) of DIR 120 indicated by SETLAT[A] in the principal congruence class CONG[A] contains a valid line (e.g., with a validity bit V=1).

One of the two entries of TLBCONG[A] selected from TLB 110 and passed along path 181 contains the real page translation of the virtual address A 150. Let such a TLB entry be denoted as TLB[A], when it exists.

The real page address recorded at DIR[A7] matches the translation result at TLB[A]. Furthermore, the address bits within the page boundary (virtual=real) of the line identified by DIR[A] matches the corresponding bits of A 150.

CMP 161 checks these conditions with typical combinatorial logic and sends a confirmation signal (e.g., a single bit C=1 for correct access and C=0 for incorrect access) along path 191 to the IE 110 requestor. When the IE 110 receives a positive signal (C=1) from the confirmation line 191, it will use the doubleword data received from the data line 192 as usual (e.g., during the next machine cycle). Otherwise the IE 110 will ignore the data received on path 192 and actions will be triggered to obtain the correct data in a later cycle. In this particular embodiment it is assumed that the IE 110, once having issued a fetch request to the cache 60, will stay in an access pending state. The access pending state will disappear only when a positive confirmation signal (C=1) is received on line 191. Different implementations may handle the IE storage access state differently, depending upon the particular requirement. For example, a design may cause the access to be re-issued by the IE 110 upon certain circumstances.

Incorrect data may be received on path 192 at the requesting IE 110 under the following possibilities:

1. TLB Miss—This happens when the TLB 110 does not have the translation information for the virtual address A 150. Typical translation process will be triggered to have the needed translation information brought into TLB 110 first.
2. TLB Hit & Cache Miss—This happens when CMP 161 detects that none of the DIR information received on path 182 can result in a match of a real line address with A 150 according to the successfully translated information TLB[A]. Standard cache miss actions will be triggered to have a copy of the line brought into the cache from MS 80. This will be called a Cache Miss condition.
3. TLB Hit & Cache Hit to the Principal Congruence Class at An Entry Different From the SETLAT Prediction—This happens when a line entry in the principal congruence class matches the real line address for A 150, but the entry is not at the set position SET[A] as predicted on path 185 by SETLAT 140. This will be called a Wrong Set Prediction condition.
4. TLB Hit & Cache Hit to A Synonym Cache Congruence Class—This happens when CMP 161 finds a match of the real address of the accessed line at a DIR entry in a synonym congruence class (other than the principal congruence class CONG[A]). (In this case it can also happen that the predicted SETLAT[A] is different from the set position (0–3) at which the actual line resides.) This will be called a Synonym Hit condition.

The translation process for a TLB miss condition will not be elaborated in detail. It is assumed that the needed translation information will be loaded into a replace entry of TLBCONG[A] through standard procedures. However, it is assumed that, once the TLB miss condition disappears, the cache unit 60 will be able to restart the waiting access for A 150 (which is remembered at a certain register or stack) as described above.

The cache miss condition will require the line to be fetched from MS 80 first. It will be assumed that the line fetch process is similar to the IBM/3090 storage design. The cache unit 60 issues a line miss fetch request to the SC 70. SC 70 will schedule the line fetch from MS 80 to cache unit 60 at a proper time. As in the IBM/3090 design, the newly fetched line will be placed (at the replaced entry) in the principal congruence class CONG[A] determined by the virtual address A 150 (vs by the real address bits after translation). It is clear that the position or the newly fetched line entry may not be reflected correctly by the predicted SETLAT[A] history. The adjustment of histories will be discussed later.

One thing that will be described now in more detail is the conventional miss bypass mechanism that has been employed for faster response to the IE 110 upon cache misses. The cache line size (e.g., 64–128 bytes) is typically a multiple of the IE request granule (e.g., 8-byte doubleword). The doubleword requested by IE 110 often is not the first doubleword in the associated storage line. The well-known miss bypass mechanism causes the line transferred from MS 80 to the cache 60 to start with the requested doubleword and continue with the rest of the data units of the line sequenced in rotating manner. As soon as the first transferred doubleword (the one requested by IE 110) comes back to the cache it will also be sent to the requesting IE 110 directly. In this way the IE 110 may resume its execution with the received data without having to wait for other data units to transfer or having to re-issue the access to the cache 60. The design in the current embodiment can support such a bypass feature effectively. When CMP 161 determines the cache miss condition, it triggers miss processing while the IE 110 is in access pending state. When the requested doubleword is bypassed to IE 110, the access pending state should be inactivated, which may be achieved either by raising the line 191 C=1 signal or by some other simple means (e.g., via a special bypassed data ready signal).

For the wrong set prediction condition, the cache line associated with the IE request is actually in the principal congruence class, but at a set entry different From the predicted SETLAT[A]. What the cache unit 60 does is to cause the doubleword to be selected from the correct set-position (e.g., in the following machine cycle) as follows. In the address-compare stage, CMP 161 not only detects the wrong set prediction condition but also determines the exact set-position for the line entry (in principal congruence class CONG[A]) from which the IE request can be satisfied. In parallel to sending the C=0 signal on path 191 to IE 110, CMP 161 also sends the correct set-position (e.g., 2 bits) it finds to the control of SETLAT 140 via the SETLAT update line 193. The control logic for SETLAT 140 will use the information received from line 193 to cause the subsequent re-access of the doubleword (e.g., in the following cycle) to be fetched correctly from the indicated set-position and cause the history SETLAT[A] to be updated accordingly. Details of the history update operation will be discussed later on. In the wrong set prediction case, the correct doubleword data has been read out of ARR 130 on path 183 and can be directly selected by the correct set-position received via path 184 without re-read (e.g., in the following cycle) as described for normal accesses. However, in most processor designs that employ the proposed mechanisms the ARR read will already be embedded into the critical path timing. As a result, in most designs it is unnecessary to complicate the control logic for a special case of late-select for already read-out data in this case.

Now consider the synonym hit condition for incorrect data access. In this case CMP 161 detects that tile accessed doubleword hits a synonym congruence class different from the principal CONG[A]. Furthermore, CMP 161 will have found tile exact set-position of the target line is the relevant synonym class. The found set-position is sent to the control of SETLAT 140 via the SETLAT update line 193, which will cause SETLAT[A] to be updated and the data accessed from the correct set-position (upon later re-access) just as for the wrong set prediction condition. What remains is to describe how data may be accessed from the correct congruence class subsequently, for which any approach could be adopted From many known proposals for handling synonym hits. One such solution, as implemented in the IBM/3090 design is the following. Upon a synonym hit, the cache control will redirect the access for the data to the synonym congruence class. Although this approach causes delay (for one or more cycles) for each synonym hit, the overall system penalty is insignificant due to the low frequency of synonym hits. The cache design currently described in this embodiment can utilize this solution with minor implementation dependent complexity. For instance, when the access is redirected to the synonym class in a later cycle, certain signals need to be passed to the control of ARR 130 to read out four doublewords from the synonym congruence class (instead of from the principal one). Upon subsequent re-access, the SETLAT update (via line 193) described above should automatically provide the correct set-position, and hence the late-select logic 162 can send the correct data to the IE 110 with its pending access state reset via a confirmation signal (C=1) from CMP 161. Another known solution to synonym hits was proposed by Chart et al. in U.S. Pat. No. 4,400,770. This solution primarily (except for certain special conditions) causes another copy of the cache line to be brought into the currently missed principal congruence class GONG[A] (vs redirecting the fetch to the synonym congruence class). This solution can also be employed by the current invention with the following exception. The control of SETLAT 140 should now receive the set-position for the new line entry inserted in the principal congruence class (instead of for the line found in the synonym congruence class). In this way incorrect set-position predictions can be avoided on subsequent accesses to the new line.

Having described the handling of incorrect data accesses, it remains to discuss the operations related to SETLAT history updates. The SETLAT control logic updates its history according to the signal 193 received from CMP 161. Depending upon particular implementations, the set-position update signal 193 can be 2 bits (encoding 4 possible set-positions) or 4 bits (with each bit indicates the selection of a particular set). In many designs SETLAT update 193 can be active for each cache access (i.e., for correct or incorrect ones), which may save an additional signal line for indicating the occasional history update activities. In many other implementations, however, it is desirable to have an additional status signal indicate whether SETLAT update 193 is active. For example, consider the situation in which SETLAT[A] is incorrect and needs to be updated for array re-access in a subsequent cycle. It could be too slow time-wise to have the SETLAT 140 entry updated first and then have it read out and sent via path 184 to the late-select unit 162 during the same cycle. (In some implementations this may require two-ported arrays for implementing the SETLAT directory.) A more efficient implementation for this case is for the SETLAT control to realize (via a special status latch for an active SETLAT update) that an update of the currently needed SETLAT[A] is pending and send out via path 184 the newly received set-position while updating SETLAT[A] in parallel.

The new design has been illustrated for an IE storage access with a virtual address. In many architectures (e.g., IBM/390) the IE may access storage in real mode as well, in which case the design will operate basically the same way, except that the TLB translation paths may be ignored. As in the IBM/3090 design, this may be easily achieved by sending a real mode indicator signal to CMP 161 to ignore the comparisons with TLB results received on path 181.

Having described fetch accessing from IE 110 in accordance with this invention, the operations associated with operand stores from IE 110 will now be described. In the IBM/3090 design a deferred store mechanism is applied. Consider an operand store request from IE 110. The request is latched into one of four store registers (STRREG's) and waits for directory priority for a directory search first. In the directory cycle, TLB 110 and DIR 120 are searched in parallel with the results compared at CMP 161 as described above. By the end of the directory cycle it is found out whether the operand Store can be putaway into ARR 130 and at which coordinates (congruence class and set). The actual operand store data putaway to ARR 130 is carried out, when permitted, in a later cycle when array priority is obtained. Although this normally delays the completion of operand stores by at least one machine cycle compared with storage fetches, the impact on overall system performance was found to be tolerable due to various overlapping of pipeline and storage operations. In this embodiment of the invention, such a deferred store scheme may be adopted as well in order to reduce complexities involved in backing up cache status when operand stores are allowed to putaway into predicted cache lines. The implementation of a deferred operand store is well-known and not directly relevant to the current invention.

What has been described above is a modification to the IBM/3090 cache design, enhanced with a history table SETLAT 140 for set-position predictions. The major benefit is the shortening of cache access critical path timing. In the IBM/3090 design one of the four doublewords read out of the arrays via path 183 can be late selected only after receiving the result of CMP 161 compares. In the improved design, in accordance with this invention, the data delivery via path 192 to IE 110 from the arrays only needs to wait for the result on path 184 of the set-prediction SETLAT[A], and the confirmation of the fetched data can be done at the IE-unit instead. With proper implementation, such a change will result in at least one fewer level of mux, and often one fewer chip crossing in the cache fetch access critical path. For certain designs this allows the implementation of a one-cycle Fetch access cache without a longer machine cycle time.

Figure 8:
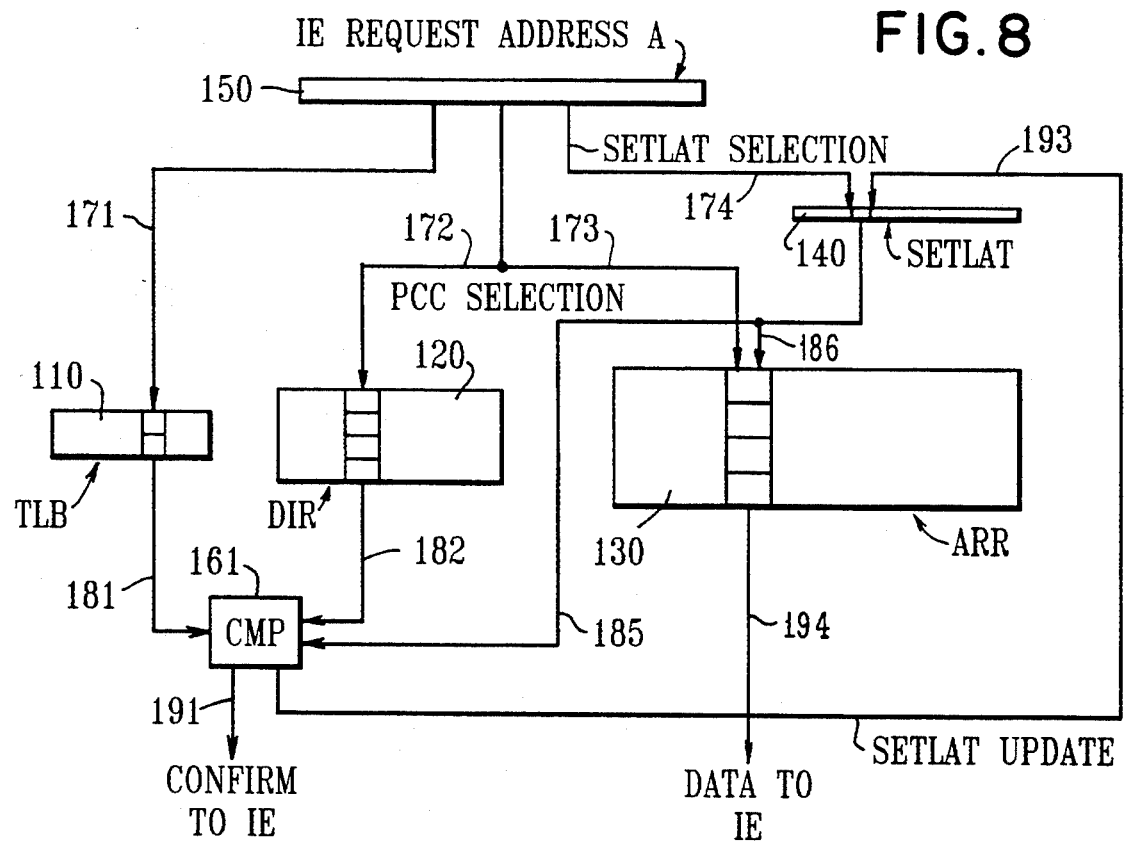
FIG. 8 is a block diagram illustrating a design in which the prediction of set-position precedes the cache array reads.

In the described new design, the data sent via path 192 to IE 110 is late-selected from the four doublewords which have been read out from ARR 130 via path 183 to the late-select unit 162. In certain designs it is possible to avoid the reading of the four doublewords. One example (FIG. 8) is to do set-position prediction and array read serially. In FIG. 8 the result of set prediction SET-LAT[A] is sent via path 186 instead to the array read control, with the late-select unit 162 being eliminated. With SETLAT[A] input to the array read control, only the predicted doubleword is read and it is sent directly to IE 110 via path 194. The reduction in the number of array reads may be beneficial for certain designs. One potential problem in this approach is the delay in the array read while waiting for SETLAT[A]. In some designs it is possible to carry out the reading of SET-LATCAT[A] in a cycle (e.g., the virtual address generation cycle) earlier than the cache access cycle. In which case this problem disappears automatically. When the SETLAT prediction is in the same machine cycle as the array read, the approach of FIG. 8 can still be optimized with customized array design. For instance, the history table SETLAT 140 can be placed on the cache array chip(s). In this way the effect of a self-imbedded late-select on the array chip(s) can be achieved with minimum delays and output I/O requirement.

Compared with a direct-mapped cache design, the current invention allows set-associativity greater than 1, which increases the cache hit ratio significantly. The only possible timing difference is that this new design requires the late-select mux 162 which a direct-mapped cache approach would not require.

Compared with the MRU approach of Chang cited earlier, the described new design allows a faster set prediction with much higher accuracy. As described earlier, the number of MRU cache lines is limited by the number of congruence classes. As a result, the MRU design cannot achieve a very high prediction accuracy (except for a huge cache, for which the invention will result in an even higher accuracy). From simulation studies based on a commercial workload, it was found that the accuracy of set-position prediction could be increased significantly as well by using a SETLAT history table that has more entries than the number of congruence classes. For instance, consider the 64 KB cache in the IBM/3090 example. There are totally 512 cache lines partitioned into 128 congruence classes. When 512 entries were used in the SETLAT history table, more than 99% accuracy on the set-position prediction was achieved among all cache hits, which practically eliminated all the penalties associated with wrong predictions.

Now, more efficient implementations of this invention will be described. In the MRU design a real-address based cache is employed. That is, a cache access can be satisfied only at the congruence class determined by the associated real address (instead of by the logical address as in the IBM/3090), which requires knowledge of synonym related real address bits before the array control can start reading the data from the MRU line in that congruence class. The MRU approach predicts such synonym bits by reading the real address bits from the MRU entry in the TLB congruence class (TLBCONG[A]), and then merges such predicted synonym bits with relevant address bits of A 150 for cache congruence class selection. The requirement of reading something from the TLB is a heavy burden on critical path timing. TLBs are becoming ever bigger (e.g., 128–2048 entries) in modern machines, and hence it is difficult and expensive to be implemented with faster circuits. Also passing TLB bits to the cache array control may involve chip crossings in certain designs. The invention eliminates such burdens by employing a virtual addressed cache, which avoids the resolution of synonym bits prior to congruence class selection. Another drawback of the MRU approach is that the set-position prediction is based on the MRU information of a particular congruence class. As a result, the set-position can be predicted only after the congruence class has been determined through use of the TLB, which poses difficulties for certain designs in optimizing tile critical path timing. In accordance with this invention, the SETLAT is a simple history table, which may be accessed (by logical access address bits) without any knowledge of the actual cache geometry. Therefore, an entry of SETLAT 140 can be selected with a logical address directly, which will often allow more efficient implementation compared with the MRU design approach.

In the above description of this invention, the IBM/3090 approach was adopted in detecting synonym conditions at the expense of many comparators for matching each possible synonym cache directory entry with each real address read out of the TLB congruence class. The amount of comparators involved may be reduced using the prediction information. For instance, in the directory search cycle for an access, it is possible to use fewer comparators to match the TLB translation information against only those real line addresses from the PCC. This however, may result in delay (e.g., 1 cycle) for some synonym hit cases. Since optimizations for synonym resolution is not the major focus of the current invention, they will not be further elaborated in this embodiment.

An embodiment has been described for a cache design utilizing SETLAT predictions based on a IBM/3090 design with each missed cache line being placed in the principal congruence class (determined by the logical access address), although each DIR entry records the real line address. Among existing system designs many have also adopted the pure real directory approach, in which a missed line is placed in the congruence class determined by the real address directly. A problem for certain implementations of such a pure real directory is the time delay for the congruence class selection. For instance, a design might determine the real address for an IE 110 access first (through a TLB) and then carry out cache array data access. Such an implementation, however, makes the cache access critical path very long because both tile TLB lookup and the cache array accessing are normally relatively slow operations.

A second embodiment of this invention will now be described, in which prediction of real address translation is used for shortening the cache access critical path. Similar to the use of a SETLAT, a history table TLBLAT may be used to predict virtual address translation information. This is described in detail and particularly claimed in the cited Related Application. FIG. 9 depicts such a design, which is a modification to FIG. 8. Reference numbers in FIG. 9 which correspond to reference numbers in FIG. 8 have been increased generally by 100 over the corresponding reference number in FIG. 8. TLBLAT 241 has been added. TLBLAT 241 is a 1-dimensional history table, which does not necessarily have the same number of entries as SETLAT 240 nor does it necessarily correspond either dimensionally or in the number of congruence classes with TLB 210. In the minimum, each entry in TLBLAT 241 contains the bits in the real page address that are required to select the real address congruence class. For example, consider a cache with 256 congruence classes and 128 bytes per line, under the access of a virtual address A 250 with 32 bits (0–31). In the following let A[m-n] (where $0 \leq m \leq n \leq 31$) denote the address bits m-n of A 250. A[25-31] is the line offset address within the line boundary. A[20-31] is the page offset address within the page boundary, which will not be affected by translation (i.e., virtual equals real). Now 8 bits of the line address A[0-24] are needed to select one of the 256 congruence classes For data access. If we pick A[17-24] to select the congruence class, the 3 bits A[17-19] can however be translated into any of the eight combinations of 3 real address bits. In this example, each TLBLAT 241 entry will contain 3 bits recording the history of the 3-bit real translation for A[7-19] in the past. For example, for a TLBLAT 241 with 64 entries, 3-bits at the entry (denoted TLBLAT[A]) indexed by A[14-19] will be the predicted real translation for A[17-19]. In this case, these 3 bits at TLBLAT[A] will be concatenated with A[20-24] to select one of the 256 cache congruence classes for predicted access.

Now consider the execution flow upon a cache access from IE 110 with a virtual address A 250 for the embodiment illustrated in FIG. 9. The following occurs in parallel first, with much similarity to the execution flow previously described in connection with FIG. 8.

1. Proper bits of A 250 are sent via path 271 to TLB 210 to read out the entries of TLB 210. The output is sent via path 281 to the compare unit CMP 261.
2. Proper bits of A 250 are sent via path 277 to the control of TLBLAT 241 to select the information of TLBLAT[A] for prediction of real address congruence class selection. The TLBLAT[A] output is sent to controls of both CMP 261, DIR 220 and ARR 230.
3. Proper bits of A 250 (e.g., A[20-24] in the above example) are sent to the controls of DIR 220 and ARR 230. These address bits (within a page boundary), concatenated with the output bits of TLBLAT, will determine the prediction of congruence class selection. When this congruence class information is ready, the following will be carried out: a) The four DIR entries at the predicted congruence class will be read out via path 282 to CMP 261, and b) Four doublewords are read out of ARR 230 and sent via path 283 to the late-select unit 262.
4. Proper bits of A 250 are sent via path 274 to the control of SETLAT 240, where the set-position prediction (SETLAT[A]) is read out and sent via path 285 to CMP 261 for verification of the prediction.

Based on the set-position prediction received on path 284, the late-select unit 262 selects one of the doublewords received on path 283 from ARR 230 and sends the selected doubleword to the requesting IE 110 via path 292 as before. What remains to described is the verification process of the predicted access, which is carried out primarily by CMP 261.

The logic of CMP 261 performs the following major functions. These functions are similar to those in the 1st embodiment (either the FIG. 7 version or the FIG. 8 version), but with minor modifications.

1. Detect the TLB hit/miss condition and verify the TLBLAT[A] prediction. The TLB hit/miss condition can be determined with standard comparators as in the IBM/3090 design. The verification of the TLBLAT[A] prediction is achieved by embedding TLBLAT[A] (e.g., 3-bits) into these enhanced comparators.
2. Detect the cache hit/miss condition and verify the SETLAT[A] prediction. The cache hit/miss condition can be determined with pair-wise comparators (matching real addresses from DIR 220 with real addresses derived from the TLB entries) in similar but simpler manner as in the IBM 3090 design. The simplification comes from the reduced number of comparators needed, since no synonym congruence classes are involved. The SETLAT[A] prediction can be verified using straightforward enhancements of the comparators logic.

Note that, in the 2nd step above, the real address bits recorded in DIR 220 may occasionally cause false hits based on an incorrectly predicted real address congruence class. The doubleword data transferred via path 292 to the IE 110 is correct only when all the following conditions are met as detected by CMP 261:

The virtual page address of A 250 is covered by TLB 210 (i.e., TLB hits) and the TLBLAT[A] prediction is correct.

A cache hit is detected at the predicted set-position (SETLAT[A]) in the predicted congruence class.

When these conditions are met, CMP 261 sends a positive (C=1) signal to IE 110 along the confirmation signal line 291, and sends a negative (C=0) signal otherwise. Similar to the 1st embodiment, the SETLAT update line 293 is used to signal SETLAT control for set-position history update when needed. In this 2nd embodiment there may also be situations (e.g., TLB misses or incorrect TLBLAT[A] predictions upon TLB hits) requiring updates of history information in TLBLAT 241. An additional signal path 294 TLBLAT Update is added for the purpose. Similar to the 1st embodiment, upon an erroneous data access sent on path 292 due to a wrong prediction, the request may be re-accessed in a later cycle.

It is clear that, since both SETLAT 240 and TLBLAT 241 are accessed based on the virtual address bits of A 250, that these two history tables may be combined to record both SETLAT[A] and TLBLAT[A] at each selected entry. In certain situations this may not be desirable due to the following reasons.

From simulation studies it was found that, compared with SETLAT 240, relatively few entries are needed in TLBLAT 241 to achieve a very high accuracies of translation prediction. As a result, circuit savings can be accomplished by separating these two history tables.

In many implementations, the timing requirements for a TLBLAT 241 access may be more critical than for a SETLAT access, since accesses to DIR 220 are depending upon the results of TLBLAT 241 (unless more than the specified DIR entries can be read out for late-select based on TLBLAT[A] or for direct matching with more comparators at CMP 261). As a result, it may be necessary to implement TLBLAT 241 with faster circuits. In such case, it is desirable to minimize the size of TLBLAT.

As discussed for SETLAT 140 in the 1st embodiment, a particular implementation may choose to carry out TLBLAT[A] in a cycle earlier than the cache directory/access cycle. In such a case, the timing requirement for the TLBLAT 241 access may be relaxed accordingly. Similarly, in real address access mode, the TLB information on path 281 may be ignored during address compares at CMP 261.

In the above description, the minimum requirement was specified that TLBLAT 241 carry at each entry just those bits (e.g., 3-bits in the discussed example with 256 congruence classes) needed to resolve the real address congruence class selection. The design (FIG. 9) of the 2nd embodiment offers other flexibilities in optimizing particular implementations. One example is to record at each TLBLAT 241 entry the full real page address history instead. That is, TLBLAT[A] could contain the real page address for the TLB translation associated with the particular entry of TLBLAT 241. This enhancement allows more cost-effective implementations. FIG. 10 depicts such a modified design.

FIG. 10 modifies FIG. 9 in breaking up CMP 261 into two parts: CMPa 261a and CMPb 261b. CMPa 261a now handles the detection of the TLB hit/miss condition and corrections of histories at TLBLAT 241. CMPb 261b now handles the DIR search and corrections of histories at SETLAT 240.

1. CMPa 261a takes inputs 281 from TLB 210 and path 211 for virtual page address information (including STO for the IBM/390 architecture) for A 250. With these inputs, CMPa can determine whether the virtual address hits TLB 210, and at which entry of TLB 210 when it does hit. Furthermore, we assume that TLB 210 is enhanced with information indicating whether each of its entries has a real address recorded at the corresponding entry (TLBLAT[A]) in TLBLAT 241. With such enhanced information CMPa 261a can determine, upon a TLB-hit, whether TLBLAT[A] contains the real page address for A 250. If so, CMPa 261a outputs a positive signal (e.g., 1-bit T=1) on path 295 to AND-gate 261c, and outputs a negative signal (e.g., 1-bit T=0) otherwise. In the event an erroneous prediction by TLBLAT 241 is detected, the correct TLBLAT[A] value is sent for history update along the TLBLAT update line 294.

2. CMPb 261b compares the real line addresses of the selected congruence class read out on path 282 from the cache directory with the predicted real address of the request A 250 (formed by concatenating the real page address prediction on path 288 from TLBLAT 241 and unspecified input address bits of A 250 within the page boundary). When a match occurs at the set-position SETLAT[A] predicted on path 285, a positive signal (e.g., 1-bit D=1) is sent on path 296 to the AND-gate 261c, and a negative signal (e.g., 1-bit D=0) is sent otherwise. If an address match occurs to a set-position other than the predicted SETLAT[A] received from SETLAT 240, correction of SETLAT[A] is signaled along the SETLAT update line 293. (Note that correction of SETLAT[A] is a design option when the TLBLAT[A] prediction fails.)

3. The AND-gate 261c will merge results from CMPa 261a and CMPb 261b (e.g., by ANDing T and D bits received) and sends a proper confirmation signal (e.g., C=T&D) to the IE 110.

4. ARR 230 is accessed based on the TLBLAT[A] prediction and a doubleword is sent on path 292 to IE 110 from late-select unit 262 similarly to the operations described for FIG. 9.

With the described modifications, the doubleword data received on path 292 by IE 110 is positively confirmed only when both CMPa 261a and CMPb 261b conclude positively. One possible advantage of the approach is the avoidance of merging data from both TLB 210 and DIR 220 directly for compares. This may allow a design physically partitioned more easily.

In the above description we assume certain tagging scheme for TLB 210 to recognize whether its entries have corresponding coverage at TLBLAT 241. This may be achieved in various ways. Consider an example design in which TLBLAT 241 is maintained as a subset of TLB 210. Each TLB 210 entry may be enhanced with a special bit L indicating its coverage at TLBLAT 241. When a virtual page entry is first created at TLB 210 (e.g., via replacement of an old entry) the associated L-bit is turned OFF (to 0). The L-bit is turned ON (to 1) when it is updated at TLBLAT 241. However, there is still a possibility that a TLBLAT entry is updated by a TLB entry different from the one setting its old value. Hence, whenever a TLBLAT 241 entry is updated, it is necessary to turn OFF the L-bit at the TLB entry that set the value previously. This procedure may be facilitated with various simple TLB/TLBLAT entry selection algorithms not elaborated here.

As discussed in the 1st embodiment, the comparators required for CMPa 261a and CMPb 261b may be reduced in various ways. For instance, CMPb may use a single comparator to verify the real address for the line entry at the predicted set position SETLAT[A]. In most implementations, however, this may not provide much value due to the fact that searching multiple DIR entries of the selected congruence class can most likely reduce the delay for wrong set-prediction (i.e., when TLBLAT predicts correctly) and can resolve cache miss conditions quickly.

Figure 11:
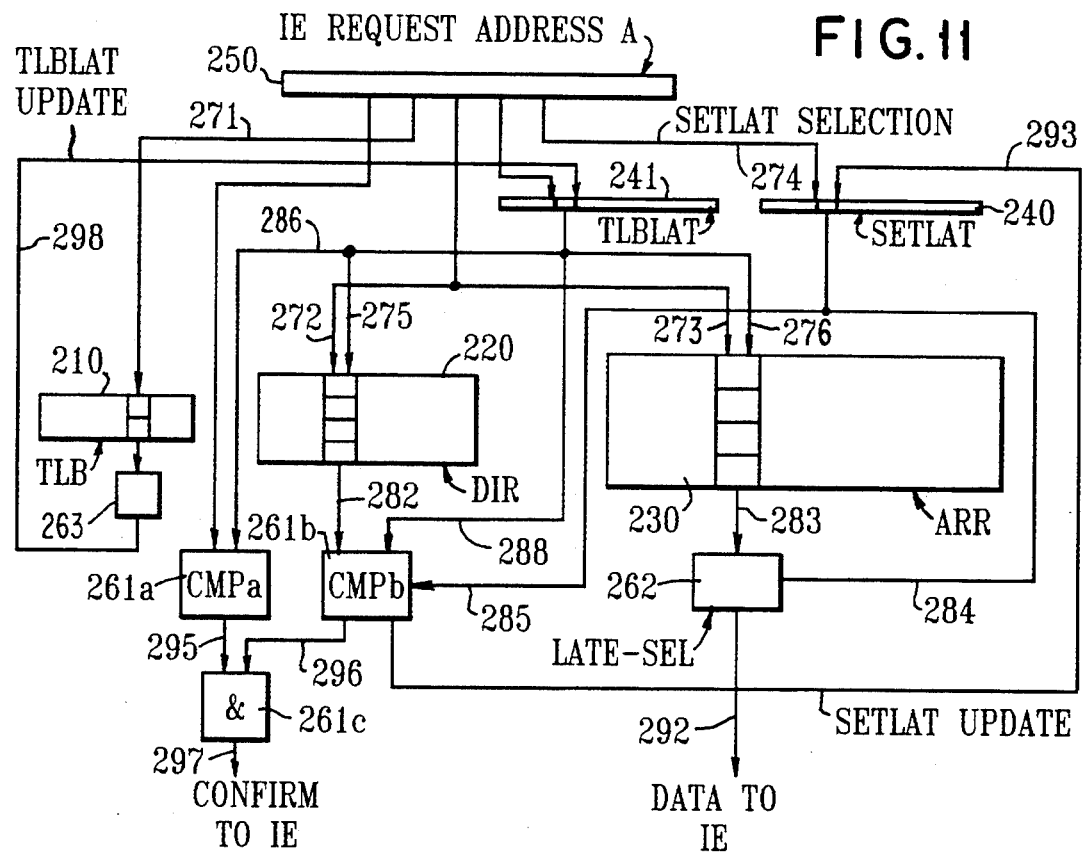
FIG. 11 is a block diagram illustrating a modification to the design of FIG. 10 with the TLBLAT further enhanced with full virtual address translation capability.

Yet another possible enhancement to the design of FIG. 10 is to include virtual address information in the TLBLAT entries (including STO for the IBM/390 architecture). In this way TLBLAT 241 becomes a 1-dimensional full-function translation table, which may be maintained as a subset of the usual TLB 210. FIG. 11 depicts a modification to FIG. 10 utilizing such a full-function TLBLAT 241.

In FIG. 11, CMPa 261a takes translation information from TLBLAT 241 directly, instead of from the bigger TLB 210. TLB 210 now only serves the purpose of feeding TLBLAT 211 with translation information (via line 298 from a separate compare unit 263) when needed. It is a design choice whether to invoke a TLB search immediately for each access or to invoke a TLB search only when the TLBLAT misses.

Note that the TLBLAT 241 utilized in the 2nd embodiment (FIG. 9–11) is used for effectively resolving needed virtual address translation information on a timely basis. The described TLBLAT 241 facility is rather independent by itself and can be used in a design without a SETLAT 240 for predicting set-positions, as described in the co-pending related application referenced above.

In the above embodiments, the fetch (read) access storage request has been considered in detail. The implementation for an operand store (write) requests from IE-units has been assumed to utilize the conventional deferred store approach. It should be clear that the proposed prediction schemes can also be used to provide efficient writes to caches. One complication which arises for prediction based cache writing is how to maintain storage integrity when a datum is putaway at the incorrect storage coordinates (cache entry for this particular invention). In the following we describe how the situation is managed for a store-thru cache design.

Store-thru is a well-known type of cache design and has been practiced in many commercial products (e.g., IBM/3033 systems). With a store-thru cache, each write into the cache array is also sent down to lower storage hierarchies (e.g., 2nd level cache or main storage). As a result, even when a line at a higher level cache hierarchy is erroneously written, the storage consistency can still be maintained via an up-to-date copy from a lower level storage hierarchy. In a typical store-thru design, the data-store is sent down to the lower level storage hierarchy with a real address (i.e., after translation from the virtual address). Hence, as long as the address specified for the store-thru is correct (e.g., without the uncertainty TLBLAT prediction)the lower level storage hierarchy will carry out the storage update without ambiguity. Hence, when the proposed prediction schemes are applied for immediate data store to cache arrays (i.e., without the pre-verification as in the deferred store approach), an erroneous array putaway (due to a wrong prediction) can easily be recovered by purging (invalidating) the relevant line(s). The operand store can be re-initiated till it is written to the correct cache line. This simple approach, however, may cause extra cache miss fetching (to the lower level storage hierarchy) if the purged line(s) get re-accessed in the near future. From simulation studies we have observed very high accuracies (from a SETLAT and TLBLAT prediction) for operand stores. This is due to the software nature that programs tend to write a piece of data after reading it first, and hence such preceding reads (fetches) normally have taken the inaccuracies and have updated the histories correctly. As a result, the overall performance penalties due to the above mentioned extra misses will be rather insignificant.

In many existing (store-in) cache designs the store-thru approach is not taken. That is, data writes to a cache are not backed up by updates to lower storage hierarchies. For such designs, a cache line erroneously stored due to an erroneous prediction may not need to be restored. For instance, if the erroneously modified line was not modified (in the cache) prior to the last update, it could be simply purged just as for a store-thru design, since an unchanged copy can be recovered from the lower level storage hierarchy. On the other hand, if the erroneously written line has carried previous changes not yet reflected at the lower level storage hierarchy, the line will need to be restored via special support. Such special data recovery mechanisms have been described in U.S. Pat. No. 4,905,141 issued to J. G Brenza.

One special benefit of the proposed cache access prediction mechanism in the above described embodiments is the reduction of array chip I/O's involved for each IE-unit access request. For instance, each access by an IE-unit can be more timely selected from cache arrays for access, without the delays involved with conventional late-select schemes. The late-select mechanisms described in FIGS. 7 and 9–11 can be carried out quickly with a proper SETLAT implementation, without the need to wait for the results of directory/TLB searches. Furthermore, as discussed in the 1st embodiment, the late-select of data from arrays may be completely avoided if the prediction of set-position from a SETLAT can be achieved at an earlier timing (e.g., in an earlier cycle or with a customized array chip). In such case, the minimum of 1 data unit (e.g., doubleword) needs to be read out of the cache arrays for each individual access request. Similarly, the benefit has been illustrated of reducing the reading of the cache directory and TLB entries for each individual storage access request from an IE-unit. Such minimization of data and directory reads offers special benefits for implementing a cache with multiple access requests per machine cycle, for which resource contentions have traditionally been a serious problem.

Figure 12:
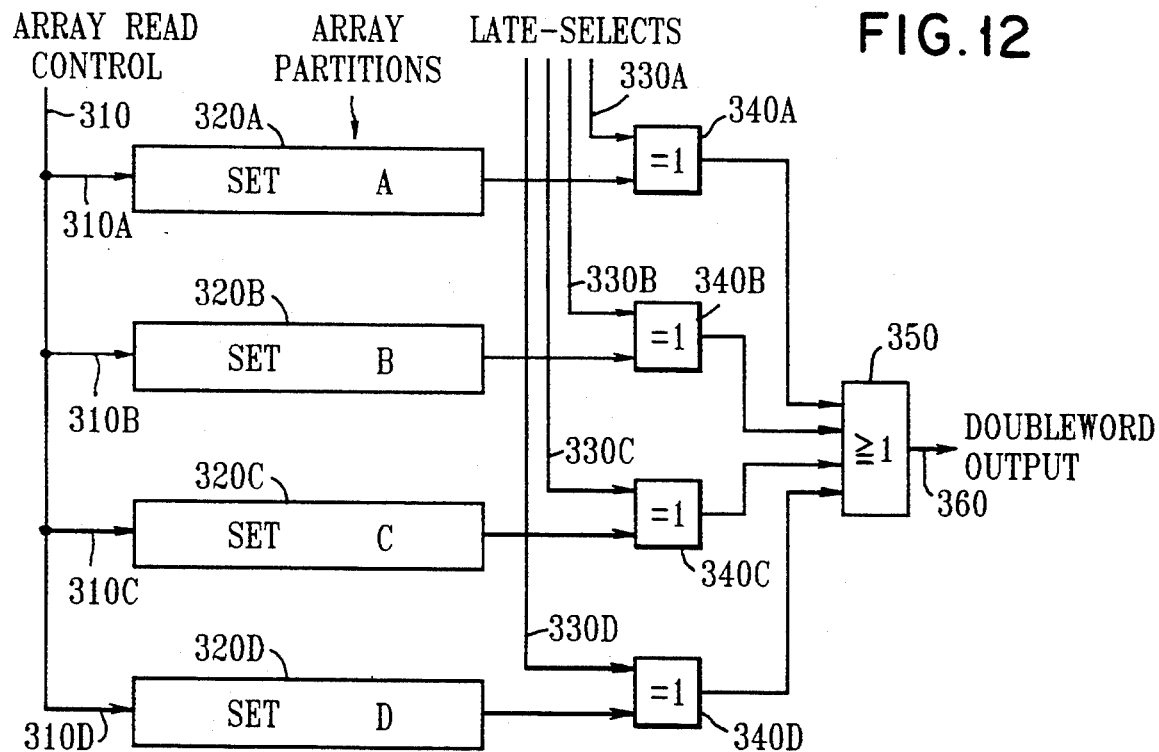
FIG. 12 is a block diagram illustrating a conventional late-select cache access structure.

In a typical set-associative cache design, the data arrays are partitioned according to the set associativity so that concurrent reads can be supported. FIG. 12 depicts one such partition scheme for a 4-way set-associative cache using late-select principles. The data array bits are partitioned into 4 groups 320A-320D, each covering the array data for a particular set A-D. During a doubleword read access, the read control signals 310A-310D (which contain the address bits of the same doubleword) first cause the corresponding four doublewords to be read out of the four array partitions 320A-320D in parallel. The AND-gates at 340A-340D perform the logical ANDing of the four doublewords of data with the respective late-select signals 330A-330D (at most one has value 1). Each of the AND-gates 340A-340D produces a doubleword output with all 0-bits if the corresponding set is not selected. The selected AND-gate outputs the exact doubleword stored in the cache arrays. All the outputs of 340A-340D are merged together through bit-wise OR's at logic 350. Hence, if a set is late-selected (e.g., upon cache hit) the output from unit 350 will be the desired doubleword stored in the arrays. (Controls for writing into the arrays are also well-known and not elaborated here.) This example clearly illustrates the overhead on array I/O's due to late-select, since at least ¾ of the data reads will be wasted. It can be highly desirable to be able to utilize the I/O's of the array partitions to support up to four independent simultaneous cache accesses instead.

Figure 13:
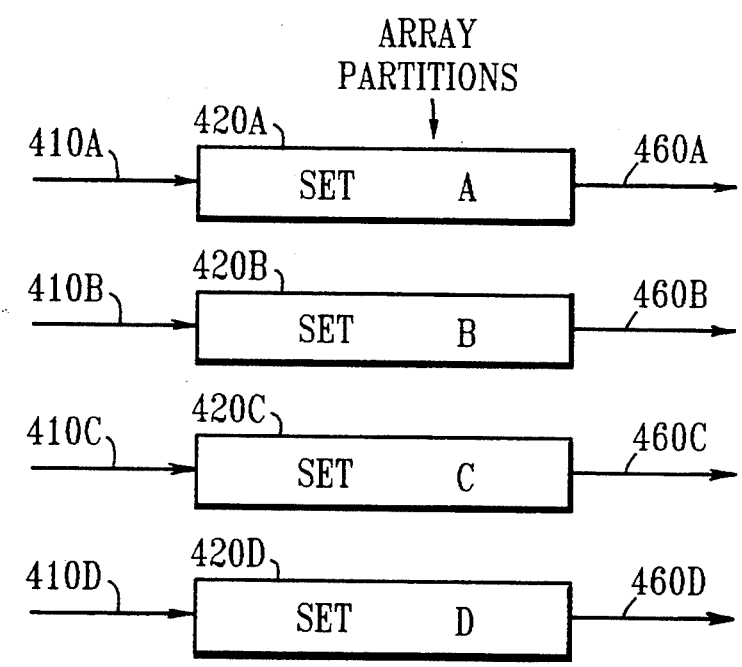
FIG. 13 is a block diagram illustrating a partitioned cache structure.

U.S. Pat. No. 4,905,141 cited earlier and entitled CACHE MEMORY WITH PARTITIONED LOOK-ASIDE TABLE (PLAT) FOR EARLY PARTITION ASSIGNMENT IDENTIFICATION issued to Brenza performs multiple independent cache accesses to the conventional set-associative partition organization described in FIG. 12. FIG. 13 depicts such a structure at the array portion, in which late-select signals are eliminated. Brenza utilizes PLAT's (Partition LookAside Tables) to precisely determine the set for independent IE-unit storage accesses in a cache in which cache congruence class selections are based on logical addresses (as in the IBM/3090 design). Each PLAT is a small logical address directory which, for a given logical address, tries to find a match of the line address. When the PLAT hits, the associated entry identifies the cache set to which the line request should be inputted (via line 410A, for example, for array partition 420A) for doubleword read out. A PLAT miss condition is resolved by interrogating the cache directory in order to initialize a new entry in the PLAT. It may happen that multiple independent accesses (e.g., from different I/E-units) simultaneously collide at the same array partition, in which case certain priority logic will honor one of them to access the array partition and delay the other(s) for later cycles. One drawback in this proposal is the need for compares at the PLAT in order to determine (precisely) the set for a cache access. This imposes a burden on timing in the critical path for many implementations. Another inconvenience for implementing PLAT's in certain designs is that each entry in the PLAT carries a full logical address (e.g., address bits and STO's), which may make it difficult or costly to utilize fast circuits for PLAT's. It is also more costly to maintain a larger number of line entries in a PLAT due to the number of circuits required, which may undesirably limit the hit ratio of a PLAT.

The prediction table SETLAT of the current invention may be utilized to much more efficiently implement a multiple access cache when the arrays are partitioned by sets as shown in FIG. 13. Each IE-unit that may independently issue a cache access request now utilizes a simple SETLAT (e.g., a copy) to accurately predict the set (i.e., partition) instead of demanding a precise result through PLAT compares. With this approach, each input 410A-410D now carries an array access request that is predicted to hit the associated partition. As in the Brenza patent, collisions to the same array partition for concurrent accesses may be properly prioritized.

Figure 14:
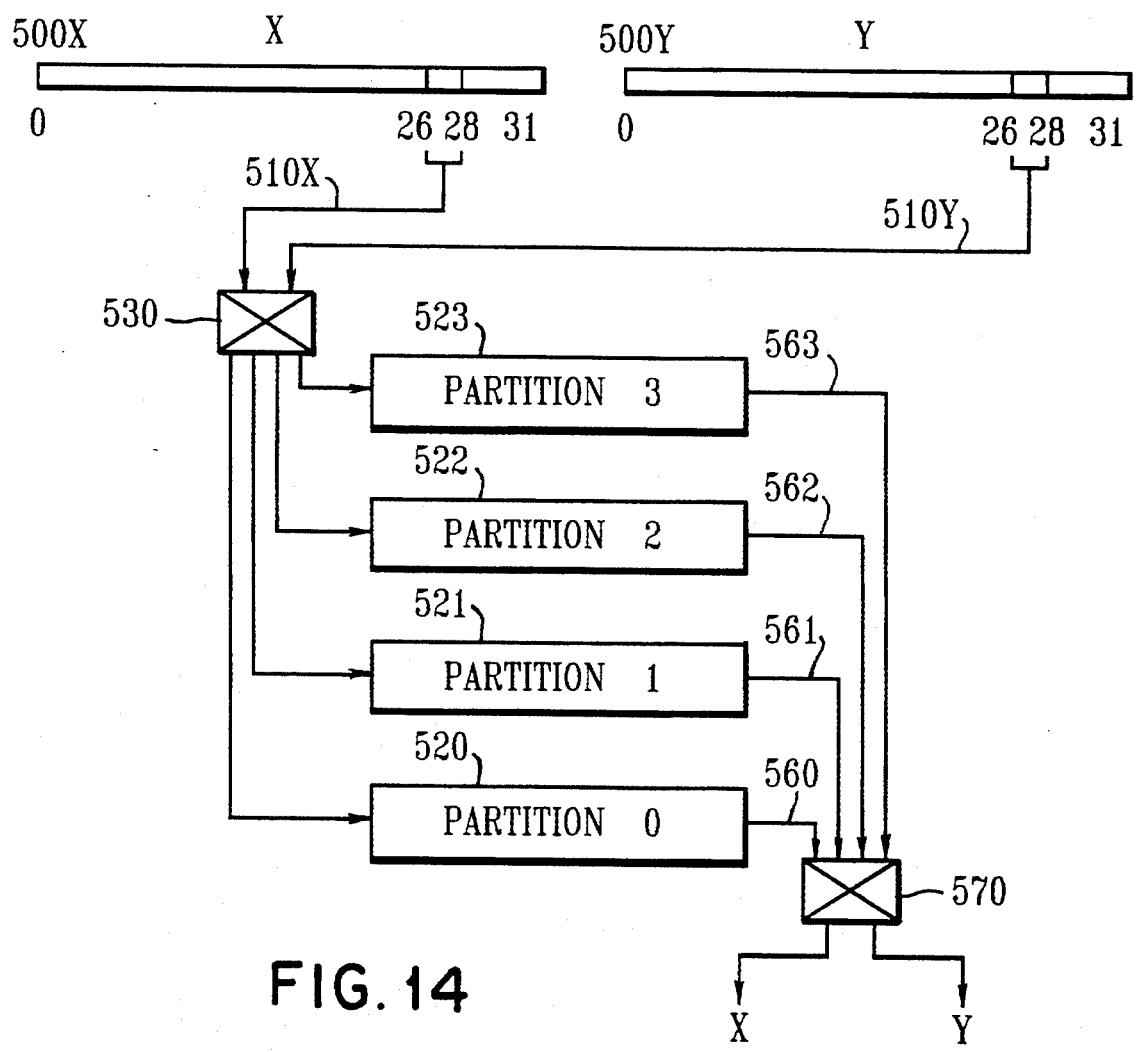
FIG. 14 is a block diagram illustrating a partitioned cache structure in accordance with this invention.

There are various other methods for partitioning cache arrays in order to support multiple accesses. One approach is to partition arrays by address bits, for which a well-known example is interleaving. For instance, consider a 4-way interleaved cache at doubleword granularity (FIG. 14). For each 32-bit access address one of the four interleave partitions 520-523 will be determined by address bits 27-28 (bits 29-31 are within the doubleword boundary). It is clear that, unless the cache line size is smaller than a doubleword (which is rather unlikely), the selection of an interleave partition is precise, since bits 27-28 are also within the page boundary and not affected by address translation at all. FIG. 14 depicts cache accesses from two independent requesting units x and y. The priority component 530 is responsible for dispatching accesses to array partitions. Component 570 represents a switching unit for sending doubleword results back to requesting units. Now consider the implementation for an 8-way set-associative cache that is 4-way doubleword interleaved as well. If a conventional late-select approach is employed, each interleave partition 520-523 will need to be further partitioned in order to support 8 doubleword reads per cycle within the partition, which results in the requirement of being able to read 32 doublewords from whole cache arrays in any cycle. Such an excessive cache array I/O requirement can be significantly reduced by limiting the amount of data reading within each interleave partition, for which the techniques for predicting set-positions utilizing SETLAT can clearly be employed. The requesting unit, say x, sends via path 510x the predicted set-position to priority unit 530, in addition to the doubleword address bits. Within each interleave partition 520-523 a single doubleword is read out 560-563 based on the input prediction of set-position. (In certain design environment where timing permits, it is certainly possible to perform prediction of set-position within the interleave partition 520-523 itself.)

One classical problem associated with interleaved caches is the contention on directory searches. For instance, for the 4-way doubleword interleaved cache illustrated in FIG. 14, there can be four concurrent accesses, all to different partitions 520-523, that collide to the same cache congruence class or even the same cache line. As a result, directory confliers between independent requests need to be resolved either through multiple directory copies or other means. One possible approach to avoiding such directory conflicts is to partition the arrays at the granule of a cache line. For instance, with 128 byte cache lines, two address bits 23-24 may be used for the selection of of array partition (address bits 25-31 are within the line boundary). With this partition scheme, the cache directory itself may correspondingly be partitioned into four partitions, each serving the access to an array partition. With such line based cache partitioning, the SETLAT history table may also be partitioned accordingly in certain implementations. Consider a design with 1 K entries in the SETLAT. For a given logical address, bits 15-24 are used to select an entry in the SETLAT, while bits 23-24 are used to select an array partition. Hence the SETLAT history entries are disjoint from each other for accesses to different array partitions.

In the current embodiment, selections of prediction table entries are done via address information. In typical designs such selection is through indexing by lower order address bits. For instance, consider the example cache with 256 congruence classes in the 2nd embodiment. Typically, cache congruence class selection for an access is determined by the 8 address bits 17-24 (lower order bits in the line address). Similarly, the index to a SETLAT with 1024 entries is determined by the 10 address bits 15-24. There have also been proposals for randomizing the selection of cache congruence classes with higher order address bits or other information (e.g., STO identification in IBM/390 architecture) involved. The benefit of such randomizations is to avoid anomalous behavior due to hot-collisions at a few congruence classes. Such randomization methods may also be applied to the selection of history entries (from a TLBLAT or a SETLAT) when appropriate.

Although in the described embodiments, a single copy of each history table (TLBLAT or SETLAT) was presented in the illustrations, such tables may be replicated whenever an implementation considers it beneficial.

In the embodiments, methods have been described on how to limit cache array reads only to the set-position based on predicted set-position for an access. Such prediction information can clearly be adopted for limiting the reading of a cache directory as well. For the purpose of verifying the validity of prediction of the set-position, it is often only needed to read the corresponding single entry in the cache directory. However, for the purpose of faster resolution of cache miss condition, most implementations may choose to read from all directory entries in the associated congruence class as in conventional set-associative cache designs.

Although in the described embodiments, a single cache was considered for a processor, the prediction techniques are clearly applicable to various other types of processor cache organizations. For instance, in many designs I/D-split caches are used for each processor. That is, a separate I-cache and D-cache is used by the processor for the accessing of instruction code (from I-unit) and the accessing of operands, respectively. The prediction mechanisms with possibly different combinations may be applied to the accessing to an I-cache and D-cache separately.

In the described embodiments, each entry in the SETLAT uses 2-bits to record the set-position history in a 4-way set-associativity cache. How such history information is recorded is subject to the convenience of any particular implementation. For instance, some designs may choose to use 4-bits (with at most 1 bit ON) to record a set-position history in order to save delays in encoding and decoding (set-positions).

Parity and error correcting bits are often used in computer designs for detecting and correcting errors of stored information (e.g., due to α-particle damages). There is no inherent requirement for such protections on the history tables for many implementations of the current invention. The history information is always verified for correctness immediately upon use. However, error detection and/or correction capabilities are generally desirable for the invention due to RAS (reliability, availability and serviceability) reasons.

Although the illustrations in the embodiments have shown how to predict the access of one line entry for a cache access, the proposed techniques can clearly be generalized to predict multiple line entries when desirable. For instance, consider a 4-way set-associative cache as illustrated. A SETLAT with 2 bits per entry can predict one set-position each time. If we use a similar SETLAT with 1 bit per entry we are able to predict a half (2 line entries) of a congruence class for access. Such prediction of multiple line entries at a time may be beneficial in terms of a better accuracy and/or a smaller SETLAT size for certain implementations.

Although the current invention has been illustrated for a processor cache in the above embodiments, the proposed techniques can clearly be applied to other storage hierarchy designs. For instance, consider the design of a 2nd level cache, which is usually accessed by real address (e.g., requested from a 1st level cache miss or update, or from I/O channels). The set-position prediction schemes (using a SETLAT) can also be applied for fast data access at such 2nd level caches.

While the invention has been described in terms of a preferred embodiment, those skilled in the art will recognize that the invention can be practiced with modification within the spirit and scope of the appended claims.

Having thus described my invention, what I claim as new and desire to secure by Letters Patent is as follows:

1. In a set-associative cache memory system of the type wherein data lines are stored in a two-dimensional logical array of rows (called sets) and columns (called congruence classes) of storage cells and a main memory (real) address corresponds to each of the stored data lines and is stored in an associated directory, apparatus for predicting a set position in the logical array for access to a desired data line from a virtual address of the desired data line before determination of a real address corresponding thereto, comprising:

a history table for storing set positions of past successful accesses to data lines in said set-associative cache, at least some of said stored set positions being stored each at an address in said history table determined by a virtual address of the data line corresponding thereto; and means for accessing said history table at an access address determined by a virtual address of a desired data line and retrieving a stored set position at said access address, said predicted set position being said retrieved set position.

2. Apparatus as defined in claim 1 wherein said history table is a one-dimensional table.

3. Apparatus as defined in claim 1 wherein an access address in said history table corresponds to and can be determined from any virtual address of a desired data line.

4. Apparatus as defined in claim 1 wherein each data line stored in said logical array is stored at a congruence class position determined by a virtual address of said each stored data line.

5. Apparatus as defined in claim 4 and further comprising:

means for providing a real address translation for said virtual address of said desired data line;

means for providing from said directory real addresses corresponding to all set position possibilities for all congruence class possibilities corresponding to said virtual address of said desired data line; and comparator logic for comparing said real address translation with said real addresses provided from said directory to determine whether said desired data line is located in said cache and if so whether said predicted set position is correct.

6. Apparatus as defined in claim 1 wherein each data line stored in said logical array is stored at a congruence class position determined by the real address of said each stored data line.

7. Apparatus as defined in claim 6 and further comprising:

a translation prediction history table (TLBLAT) for storing real address translations corresponding to virtual addresses for predicting a congruence class from said virtual address of said desired data line; and means for providing from said cache to a processor a data line stored in said cache at said predicted set position and at said predicted congruence class position.

8. Apparatus as defined in claim 7 and further comprising:

means for providing a correct real address translation for said virtual address of said desired data line to determine whether said predicted congruence class is correct;

means for providing from said directory real addresses corresponding to all set position possibilities for said predicted congruence class; and comparator logic for comparing said correct real address translation with said real addresses provided from said directory to determine in the event said predicted congruence class is correct whether said predicted set position is also correct.

* * * * *